358-86. XR 3,278,675 SR

CROSS REFERENCE SEARCH ROOM

TX500

INVENTOR
Eric John Gargini
BY
Richard [illegible]
Agt

Oct. 11, 1966 E. J. GARGINI 3,278,675

WIRED BROADCASTING SYSTEMS AND APPARATUS THEREFOR

Filed May 17, 1963

2 Sheets-Sheet 2

INVENTOR
Eric John Gargini
BY
Richard [illegible]
AGT

United States Patent Office 3,278,675
Patented Oct. 11, 1966

3,278,675

WIRED BROADCASTING SYSTEMS AND APPARATUS THEREFOR

Eric John Gargini, West Drayton, Middlesex, England, assignor to Communications Patents Limited Filed May 17, 1963, Ser. No. 281,176
17 Claims. (Cl. 178—5.2)

Figure 1:
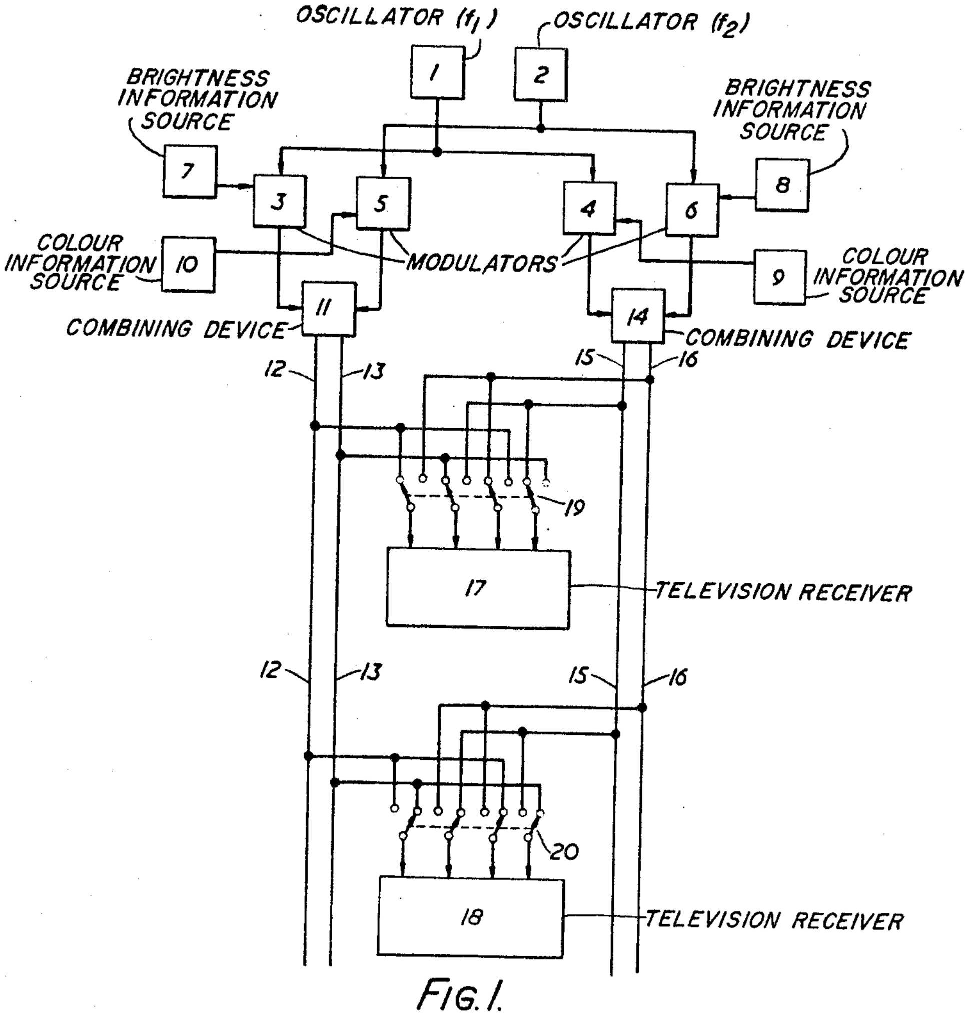

This invention relates to wired broadcasting systems and apparatus for use therein and is particularly concerned with such systems and apparatus which pertain to colour television. An object of the invention is to provide such colour television systems and apparatus which are less complex than those previously proposed.

According to a first aspect of the invention there is provided a wired broadcasting system comprising a conductive network which provides at least two signal paths, transmitting appartus for producing in respect of each of at least two colour television transmissions and applying to said paths a modulated carrier wave brightness information component and a suppressed carrier wave colour information component, and means serving to ensure that for each such colour component present in one such path there is made available in another such path a brightness information component the carrier frequency of which corresponds to that of the suppressed carrier of this colour component whereby a television receiving apparatus which is arranged to receive simultaneously an input from two such signal paths can utilise the carrier wave of such a brightness information component available from one of these paths to obtain a reinsertion carrier for use in demodulating such a colour information component available from another path.

According to a second aspect of the invention a transmitting apparatus, for use in a wired broadcasting system as herein provided, comprises modulator devices through the intermediary of which there is obtained, in respect of each of a plurality of colour television transmissions, a modulated carrier wave brightness information component and a suppressed carrier wave colour information component, means serving to ensure that the frequency pertaining to the suppressed carrier wave of each such colour components corresponds to that of a carrier wave pertaining to such a brightness component, and means whereby these components are or can be applied to the conductive network in a manner such that for each such colour component present in one signal path of this network there is made available in another signal path of this network a brightness component the carrier frequency of which corresponds to that of the suppressed carrier of this colour component.

According to a third aspect of the invention a colour television receiving apparatus, for use in a wired broadcasting system as herein provided, comprises means for obtaining simultaneously from two signal paths of a conductive network of the system two modulated carrier wave brightness information components each pertaining to a different television transmission, and a suppressed carrier wave colour information component pertaining to one of these transmissions and means serving to derive from the carrier wave of one of these brightness information components an electric wave which is used as the reinsertion carrier for demodulating the said colour information component.

In general, a system and apparatus according to the invention will involve or pertain to the use of as many signal paths of a conductive network as there are different colour television transmissions. For example, in a three-programme system in which each transmission pertains to a different programme, three separate signal paths would be provided and in such a case a receiving apparatus is arranged to receive simultaneously an input from any two such paths and is adapted to utilise the carrier wave of the brightness information component of any one of the three transmissions to obtain a reinsertion carrier for use in demodulating the colour information component of one of the other transmissions.

In some cases the signal components made available in a signal path of the network can pertain to the same transmissions. Furthermore it is to be understood that two or more such transmissions might pertain to the same programme material, that is to say the same programme material is distributed over the system by the simultaneous use of two or more transmissions.

Figure 2:
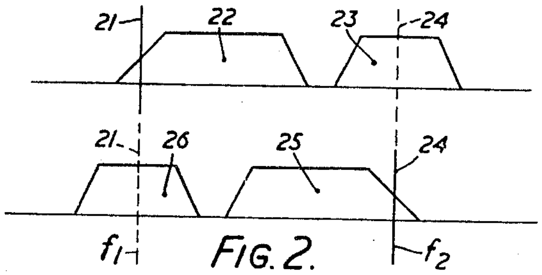
Figure 3:
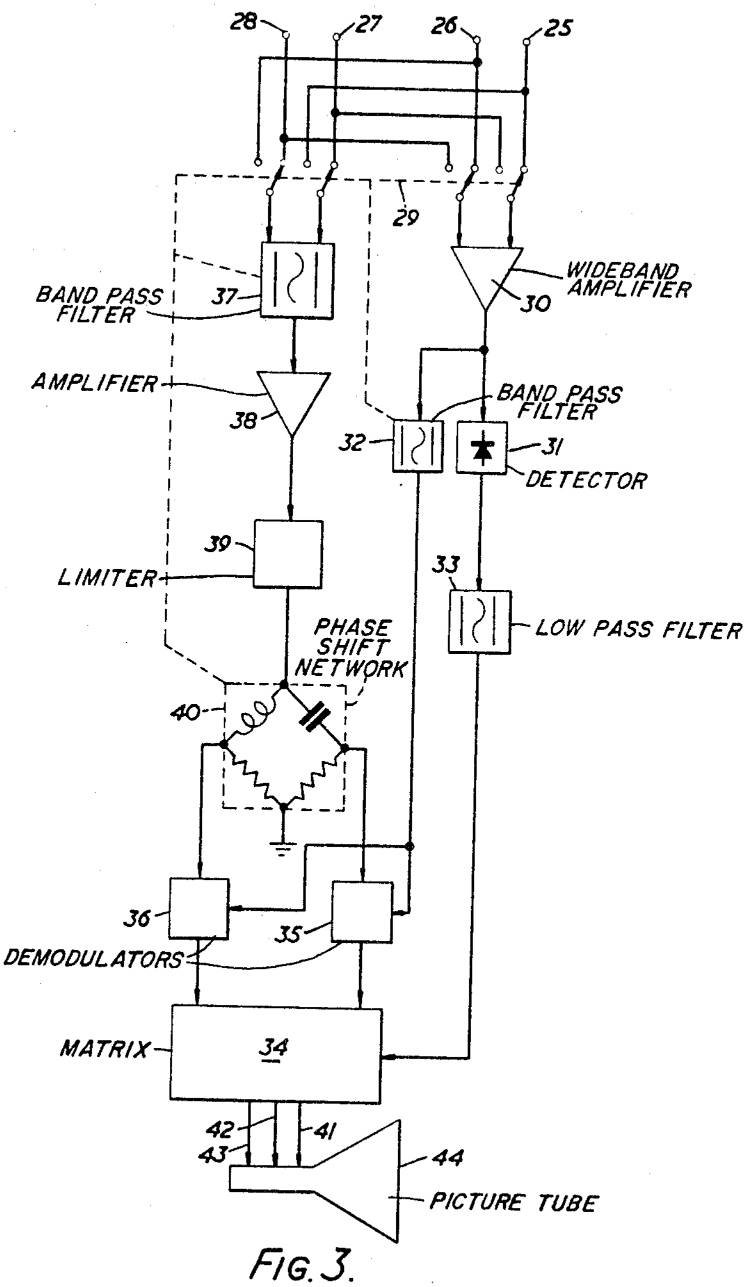

To facilitate a proper understanding of the invention it will now be described, merely by way of example, with reference to the accompanying drawings, wherein:

FIG. 1 is a block schematic diagram of a wired broadcasting system in accordance with the present invention, FIG. 2 is a diagram showing the frequency relationship of signals involved in the system of FIG. 1 and FIG. 3 is a detailed block schematic diagram of a receiving apparatus shown in FIG. 1.

In the system shown in FIG. 1 the transmitting apparatus comprises oscillators, 1 and 2, for producing electric waves having the frequencies $f_1$ and $f_2$ (FIG. 2) respectively. For each of these waves there is provided a pair of modulator devices, those of the first pair, 3 and 4, receiving an input from the oscillator 1 and those of the other pair, 5 and 6, receiving an input from the oscillator 2. The modulator devices 3 and 6 are each arranged to provide a modulated carrier wave in accordance with brightness information signals, in respect of two television programme transmissions, which are derived from their respective sources 7 and 8. The modulator devices 4 and 5 are each arranged to provide an independent sideband suppressed carrier signal in accordance with the corresponding colour information of these two transmissions by signals derived from the sources 9 and 10 respectively. The modulator devices 3 and 5 are arranged to feed their outputs to a combining device 11, which supplies signals to the conductors 12, 13 of a first signal path of the system, and the modulator devices 4 and 6 are arranged to feed their outputs to a combining device 14, which supplies signals to the conductors 15, 16 a second signal path of the system.

The drawing shows two sets of receiving apparatus, 17 and 18, arranged to receive the colour television signals transmitted over the system. Each set of receiving apparatus has associated therewith a programme selection device in the form of a switch 19 and 20 respectively. The setting of these switches will determine which of the colour television transmissions is reproduced by the receiving apparatus, although in either position of these switches the receiving apparatus is connected to both the said first and second signal paths simultaneously. The signals on the two paths are shown in FIG. 2. That on the first signal path, defined by the conductors 12, 13 comprises a carrier wave 21 of a frequency $f_1$, modulated by the brightness information of a first colour television transmission, the modulation occupying the modulation band 22. This first signal path also carries a colour information component of this first transmission in the form of two independent sets of sidebands arranged in phase quadrature and occupying the modulation band 23 which is related to a suppressed carrier 24 having the frequency $f_2$. The relationship between the frequencies $f_1$ and $f_2$ may be anything which is desired or convenient, and may, for example, lie in the range 4–10 mc./s. Further and as shown in the drawing, the relationship may be such that the colour information signal sidebands lie outside the brightness information modulation band 22. Alternatively the relationship may be such that the colour information signal sidebands lie partially or wholly within said modulation band 2. The signal on the second signal path, defined by the conductors 15, 16 comprises a carrier wave 24 of the frequency $f_2$ modulated by the brightness information of a second colour television transmission, the modulation occupying the modulation band 25. This second signal path also carries a colour information signal of this second transmission in the form of two sidebands arranged in phase quadrature and occupying the modulation band 26 which is related to a suppressed carrier 21 having the frequency $f_1$.

In order to demodulate the two phase quadrature sidebands in the modulation bands 23 and 26 it is necessary to reinsert the suppressed carrier at the demodulator of the receiving apparatus and for this purpose the receiving apparatus is connected to both signal paths simultaneously and is arranged to derive from one signal path the required brightness information component and a colour information component and from the other signal path the carrier wave of the brightness information component thereon for use as the reinsertion carrier for demodulating the said colour information component. The colour television transmissions on the two paths may be either the same or different as regards their programme content without effecting the basic operation of the system. Where the programme material is the same for both transmissions it would be unnecessary to provide programme selection means, such as the switching means 19, 20 of FIG. 1, as the input circuits of the receiving apparatus can be permanently connected to the signal paths. However, for the purpose of the present description it is being assumed that the programme content of the two transmissions is different and therefore the switching means 19 and 20 is provided in order to enable, for one setting thereof, the brightness and colour information components to be derived from the first path (12–13) and the carrier wave of the brightness information omponent derived from the second path (15–16) or alternatively, for another setting of the switching means, the brightness and colour information components to be derived from said second path and the carrier wave of the brightness information component to be derived from said first path, the switching means being in effect a programme selection device.

A suitable receiving apparatus as shown in more detail in FIG. 3 and in this example the programme selection device is arranged as an integral part of the apparatus. Two pairs of input terminals, 25–26 and 27–28, are provided for connection to the conductors defining the respective signal paths of the system and the programme selection device, in the form of a switch 29, enables the connections between these pairs of terminals and the remainder of the receiving apparatus to be changed according to which of the two colour television transmissions is to be reproduced. In the position shown the switch 29 connects the input terminals 25–26 to a wideband amplifier 30 which is arranged to amplify both brightness and colour information components which may be applied between those terminals. The amplified components appearing at the output of this amplifier are fed to a detector 31 and a band pass filter 32. The signal from the detector 31 is applied to a low pass filter 33 which is arranged to permit the passage of the brightness information signal to a matrix 34 the function of which will be explained later. The band pass filter 32 is arranged to pass the colour information components and its output is fed as an input to each of two demodulators 35, 36, each pertaining to a corresponding set of sidebands of the colour information signal. Another input in the form of a signal having the same frequency as that of the suppressed carrier of the colour information signal must be applied to the demodulators 35, 36 to effect demodulation of the signals passed through the filter 32. This signal is derived from the brightness information component of the signal applied between the pair of terminals 27–28 and for this purpose the switch 29 connects this pair of terminals to a band pass filter 37 arranged to pass a relatively narrow band of frequencies about that of the carrier of this brightness information component. The selected frequency band is then amplified by an amplifier 38 and passed to a limiter device 39 to reduce amplitude variations from the signal such as might be caused for example by the modulation applied to it and by variations of attenuation in the signal path between the transmitting and receiving apparatus. The output signal from the limiter device 39 is a signal of substantially constant amplitude having a frequency corresponding to that of the suppressed carrier of the colour information component.

Since the two independent sets of sidebands of the colour information component are in phase quadrature the signal from the limiter device 39 must be applied to one demodulator device in phase quadrature to that applied to the other demodulator device. For this purpose the output of the limited device 39 is applied to a phase shift network 40 which is arranged to define two signal paths, one to the demodulator 35 and the other to the demodulator 36. The signal passing along one path is retarded by 45° while that passing along the other is advanced by 45°. Thus the signal applied to one demodulator differs in phase from that applied to the other by 90°. It will be understood that as the frequencies of the carrier wave of the brightness information component and the frequency bands occupied by the colour information component differ for each of the two television transmissions it will be necessary to vary the frequency bands passed by the filters 32 and 33 and to vary the value of the inductor and capacitor in the phase shift network 40. Such variation may be effected either by adjustment of individual components or by complete substitution of the filters and this network under the control of switching means which, as indicated in dotted lines, may be ganged with the switch 29.

The output signals from the demodulators 35 and 36 are passed to the matrix 34 together with the brightness information component as mentioned previously. From these three signals the matrix is arranged to provide, in known manner, red, green and blue colour signals on the lines 41, 42 and 43 respectively for application to the corresponding control electrodes of a colour television picture tube 44.

It will be seen that the colour television system and apparatus provided by the invention is economical in the amount of frequency spectrum required and avoids the need to provide in the receiving apparatus a carrier reinsertion oscillator and the arrangements for controlling it to oscillate at the correct frequency and phase.

The system shown in FIG. 1 can be modified in that instead of each signal path carrying brightness and colour components pertaining to the same transmission, it can be arranged for each of these paths to carry one component only in respect of each transmission. In such an arrangement the transmitting apparatus would be modified to ensure that the same frequency is adopted for the carriers pertaining to the brightness and colour components of the same transmission. Appropriate modification of the receiving apparatus would also be required.

In a further modified embodiment of the invention one of two signal paths of the conductive network of the system serves to carry brightness components in respect of a plurality of transmissions and the other signal path serves to carry corresponding colour components.

What I claim is:

1. A wired broadcasting system comprising a conductive network which provides at least two signal paths, transmitting apparatus for producing in respect of each of at least two colour television transmissions and applying to said paths a modulated carrier wave brightness information component and a suppressed carrier wave colour information component, and means serving to ensure that for each such colour component present in one such path there is made available in another such path a brightness information component the carrier frequency of which corresponds to that of the suppressed carrier of this colour component, a television receiving apparatus, means connecting said television receiving apparatus to each of said two paths simultaneously, means for utilizing said modulated carrier wave brightness information component and said suppressed carrier wave colour information component from one of said two signal paths in the reproduction of one of said colour television transmissions, said means including a synchronous detector device for demodulating said suppressed carrier wave colour information component with the aid of a reinsertion carrier, and means for utilizing the carrier wave of said modulated carrier wave brightness information component from the other of said two signal paths to provide said reinsertion carrier for said synchronous detector device.

2. A wired broadcasting system as claimed in claim 1 wherein the carrier wave of the brightness information component of one transmission and the suppressed carrier wave of the colour information component of another transmission which is destined to be demodulated by the carrier wave of said brightness information component are derived from a common oscillator means.

3. A wired broadcasting system as claimed in claim 1 wherein the transmitting apparatus comprises modulator devices through the intermediary of which there is provided, in respect of each of a plurality of colour television transmissions, a modulated carrier wave brightness information component and a suppressed carrier wave colour information component, means serving to ensure that the frequency pertaining to the suppressed carrier wave of each such colour information component corresponds to that of a carrier wave pertaining to such a brightness information component, and means whereby these component are or can be applied to the conductive network of the system in a manner such that for each colour information component present in one of the signal paths of this network there is made available in another signal path of the network a brightness information component the carrier frequency of which corresponds to that of the suppressed carrier of this colour component.

4. A wired broadcasting system as claimed in claim 3 where the transmitting apparatus comprises a source of electric wave oscillations and means serving to derive from this source the carrier wave in respect of a brightness information component pertaining to one of said signal paths and the suppressed carrier wave in respect of a colour information component pertaining to another signal path of the system.

5. A wired broadcasting system as claimed in claim 3 wherein the modulator devices are arranged in two pairs, the devices of one pair being arranged to receive as an input thereto a carrier wave of one frequency from a first common source of electric wave oscillations and the devices of the other pair being arranged to receive as an input thereto a carrier wave of another frequency from a second common source of electric wave oscillations.

6. A wired broadcasting system as claimed in claim 5 wherein one modulator device of each pair is arranged to provide a modulated carrier wave brightness information component and the other modulator device of each pair is arranged to provide a suppressed carrier wave colour information component.

7. A wired broadcasting system as claimed in claim 6 comprising a signal combining device whereby the modulated carrier wave brightness information component from a modulator device of one pair is combined with the suppressed carrier wave colour information component from a modulator device of the other pair and means serving to feed the output of said combining device to a signal path of the conductive network of the system.

8. A wired broadcasting system as claimed in claim 7 wherein the said signal combining device serves to combine brightness and colour information components which pertain to the same colour television transmission.

9. A colour television receiving apparatus for use in a wired broadcasting system, comprising input circuits for electrical connection to two signal paths of the conductive network of the system to obtain simultaneously from these paths two modulated carrier wave brightness information components, each pertaining to a different television transmission, and a suppressed carrier wave colour information component pertaining to one of these transmissions and means serving to derive from the carrier wave of one of these brightness information components an electric wave which is used as a reinsertion carrier for demodulating the said colour information component.

10. A colour television receiving apparatus as claimed in claim 9 wherein a first of the input circuits serves to convey signals from a signal path of the conductive network to first and second filters which operate to separate the brightness information components from the colour information components derived from said path.

11. A colour television receiving apparatus as claimed in claim 10 wherein said first filter passes brightness information components and impedes colour information components, said second filter passes colour information components and impedes brightness information components, and a demodulator device is interposed between the input circuit and said first filter.

12. A colour television receiving apparatus as claimed in claim 10 wherein a second of the input circuits serves to convey signals from another signal path of the conductive network to a filter which passes signals over a narrow band only about the frequency of the modulated carrier wave brightness information component derived from this other path and there is provided a limiter device to which the filtered carrier wave is applied to obtain a signal of approximately constant amplitude for use as a re-insertion carrier signal in respect of the suppressed carrier wave colour information components conveyed by the first input circuit.

13. A colour television receiving apparatus as claimed in claim 12 comprising a phase-shift network to which the reinsertion carrier signal is applied and from which there is obtained two output signals of corresponding frequency but differing in phase.

14. A colour television receiving apparatus as claimed in claim 13 comprising two demodulation devices to each of which a separate one of the two output signals is applied and said devices are also arranged to receive for demodulation the suppressed carrier wave colour information components conveyed by the first input circuit.

15. A colour television receiving apparatus as claimed in claim 14 comprising a matrix device to which there is applied the outputs from the said two demodulators and also the brightness information component conveyed by the first input circuit, this matrix device serving to provide colour information signals for controlling a colour television display device.

16. A colour television receiving apparatus as in claim 9 comprising switching means whereby the two input circuits thereof can be connected electrically to any one of different pairs of signal paths of the conductive network of a wired broadcasting system.

17. A colour television receiving apparatus as claimed in claim 13, comprising switching means for switching said two input circuits to be connected electrically to any one of different pairs of signal paths of the conductive network of a wired broadcasting system, and means, ganged for operation with said switching means, for adjusting, in dependence upon the particular pair of signal paths of said conductive network with which said two input circuits are electrically connected, the carrier filter pertaining to the second input circuit of said receiving apparatus, the characteristics of the phase-shift network also pertaining to this second input circuit, and the colour information pass filter pertaining to the first input circuit of the receiving apparatus.

References Cited by the Examiner

FOREIGN PATENTS 723,123 2/1955 Great Britain.

DAVID G. REDINBAUGH, *Primary Examiner.*

J. A. O'BRIEN, *Assistant Examiner.*